United States Patent
Malygin et al.

(10) Patent No.: US 10,067,696 B2
(45) Date of Patent: Sep. 4, 2018

(54) CAPACITY EXHAUSTION PREVENTION FOR DISTRIBUTED STORAGE

(71) Applicant: EMC Corporation, Hopkinton, MA (US)

(72) Inventors: Mikhail Malygin, Saint Petersburg (RU); Mikhail Danilov, Saint Petersburg (RU); Chen Wang, Shanghai (CN); Ivan Tchoub, Saint Petersburg (RU); Andrey Fomin, Vesevolozhsk (RU)

(73) Assignee: EMC Corporation, Hopkinton, MA (US)

( * ) Notice: Subject to any disclaimer, the term of this patent is extended or adjusted under 35 U.S.C. 154(b) by 79 days.

(21) Appl. No.: 15/186,576

(22) Filed: Jun. 20, 2016

(65) Prior Publication Data

US 2017/0177248 A1    Jun. 22, 2017

(30) Foreign Application Priority Data

Dec. 18, 2015   (RU) .............................. 2015154486

(51) Int. Cl.
*G06F 12/00*    (2006.01)
*G06F 3/06*    (2006.01)

(52) U.S. Cl.
CPC ............ *G06F 3/0619* (2013.01); *G06F 3/065* (2013.01); *G06F 3/067* (2013.01)

(58) Field of Classification Search
CPC ......... G06F 3/0619; G06F 3/065; G06F 3/067
See application file for complete search history.

(56) References Cited

U.S. PATENT DOCUMENTS

| | | | |
|---|---|---|---|
| 6,070,003 A | 5/2000 | Gove et al. | |
| 6,550,035 B1 | 4/2003 | Okita | |
| 7,549,110 B2 | 6/2009 | Stek et al. | |
| 7,559,007 B1 | 7/2009 | Wilkie | |
| 7,581,156 B2 | 8/2009 | Manasse | |
| 8,458,515 B1 * | 6/2013 | Saeed | G06F 11/141 714/6.22 |
| 8,532,212 B2 | 9/2013 | Ito | |
| 8,683,296 B2 | 3/2014 | Anderson et al. | |
| 8,683,300 B2 | 3/2014 | Stek et al. | |
| 8,762,642 B2 | 6/2014 | Bates et al. | |
| 8,914,706 B2 | 12/2014 | Anderson | |
| 2005/0038968 A1 | 2/2005 | Iwamura et al. | |
| 2006/0105724 A1 | 5/2006 | Nakao | |
| 2006/0147219 A1 | 7/2006 | Yoshino et al. | |
| 2008/0126357 A1 | 5/2008 | Casanova et al. | |
| 2009/0112953 A1 | 4/2009 | Barsness et al. | |
| 2010/0091842 A1 | 4/2010 | Ikeda et al. | |
| 2010/0180176 A1 | 7/2010 | Yosoku et al. | |

(Continued)

OTHER PUBLICATIONS

U.S. Appl. No. 14/929,788, filed Nov. 2, 2015, Kurilov et al.

(Continued)

*Primary Examiner* — Gurtej Bansal
(74) *Attorney, Agent, or Firm* — Daly, Crowley, Mofford & Durkee, LLP

(57) ABSTRACT

Systems and processes to prevent storage capacity exhaustion within distributed storage systems using chunk-based storage. The systems and processes control capacity by classifying various types of storage chunks into groups and impose used capacity thresholds on chunk groups.

13 Claims, 8 Drawing Sheets

(56) References Cited

U.S. PATENT DOCUMENTS

| | | | |
|---|---|---|---|
| 2010/0246663 | A1 | 9/2010 | Citta et al. |
| 2011/0053639 | A1 | 3/2011 | Etienne Suanez et al. |
| 2011/0055494 | A1* | 3/2011 | Roberts ................ G06F 3/0607 |
| | | | 711/154 |
| 2011/0196900 | A1 | 8/2011 | Drobychev et al. |
| 2012/0051208 | A1 | 3/2012 | Li et al. |
| 2012/0106595 | A1 | 5/2012 | Bhattad et al. |
| 2013/0067187 | A1* | 3/2013 | Moss ................ G06F 3/0689 |
| | | | 711/170 |
| 2014/0046997 | A1 | 2/2014 | Dain et al. |
| 2016/0239384 | A1 | 8/2016 | Slik et al. |
| 2017/0046127 | A1 | 2/2017 | Fletcher et al. |

OTHER PUBLICATIONS

U.S. Appl. No. 15/083,324, filed Mar. 29, 2016, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/281,172, filed Sep. 30, 2016, Trusov et al.
U.S. Appl. No. 15/398,832, filed Jan. 5, 2017, Danilov et al.
U.S. Appl. No. 15/398,826, filed Jan. 5, 2017, Danilov et al.
U.S. Appl. No. 15/398,819, filed Jan. 5, 2017, Danilov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
U.S. Non-Final Office Action dated Feb. 2, 2018 for U.S. Appl. No. 15/398,826; 16 Pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.

* cited by examiner

CAPACITY EXHAUSTION PREVENTION FOR DISTRIBUTED STORAGE

CROSS REFERENCE TO RELATED APPLICATIONS

This application claims priority to Russian Application Number 2015154486, filed on Dec. 18, 2015, and entitled "CAPACITY EXHAUSTION PREVENTION FOR DISTRIBUTED STORAGE," which is incorporated herein by reference in its entirety.

BACKGROUND

As is known in the art, distributed storage systems, such as Elastic Cloud Storage (ECS) from EMC Corporation of Hopkinton, Mass., provide a wide range of storage services. Some distributed storage systems (e.g., ECS) manage storage capacity by partitioning storage devices into fixed-size blocks referred to as "storage chunks" or "chunks." Various types of information, including user data, system data, and metadata, may be stored in chunks.

Various users and system processes may allocate storage chunks. Over time, the number of allocated chunks—and, thus, used storage capacity—tends to increase. Even operations to delete user data may require allocating new storage chunks. Likewise, system processes that reclaim unused storage chunks (e.g., garbage collection) may allocate storage chunks.

Without proper controls, it is possible to end up in a situation when no new storage chunks can be allocated due to lack of free storage space (e.g., disk space). There may be no way to recover from this situation because deleting user data and reclaiming unused capacity both require allocating new storage chunks.

SUMMARY

It is appreciated herein that there is need for control mechanisms to prevent storage capacity exhaustion in distributed storage systems using chunk-based storage. Described herein are systems and processes that can limit storage capacity used by various users and system processes by disabling storage chunk allocation when used storage capacity exceeds predetermined threshold values. Compared to existing quota/reservation-based approaches, the threshold-based mechanisms described herein provide greater flexibility by allowing different users to share storage capacity, while prioritizing critical system tasks in an adaptive manner.

According to one aspect of the invention, a method is provided for use with a storage node of a distributed storage system having a plurality of storage nodes, the storage node having a plurality of storage devices. The method may include: maintaining statistics on storage capacity used within the storage devices; receiving a request to allocate a storage chunk having a given chunk type; using the chunk type to determine a chunk group from a plurality of chunk groups, each of the chunk groups having an assigned used capacity threshold; determining a node used capacity based on the statistics; and allocating a new storage chunk within the plurality of storage devices only if the node used capacity is less than the chunk group used capacity threshold. In some embodiments, the method further includes: returning an error indicating insufficient storage capacity if the node used capacity is greater than the chunk group used capacity threshold. In some embodiments, the method further includes using hysteresis to prevent frequent switching between accepting new user data and not accepting new user data.

According to another aspect of the disclosure, a distributed storage includes a plurality of storage nodes each having one or more storage devices. The storage nodes may be configured to: maintain statistics on storage capacity used within the storage devices; receive a request to allocate a storage chunk having a given chunk type; use the chunk type to determine a chunk group from a plurality of chunk groups, each of the chunk groups having an assigned used capacity threshold; determine a node used capacity based on the statistics; and allocate a new storage chunk within the plurality of storage devices only if the node used capacity is less than the chunk group used capacity threshold. In some embodiments, the storage nodes are further configured to return an error indicating insufficient storage capacity if the node used capacity is greater than the chunk group used capacity threshold.

In certain embodiments of the method and/or system, the chunk groups include a user group associated with user data and a system group associated with system data. A used capacity threshold assigned to the system group may be greater than a used capacity threshold assigned to the user group such that the system can store new system data but not new user data when the node used capacity exceeds the used capacity threshold assigned to the user group. In some embodiments, the chunk groups include a replication group associated with replication data. A used capacity threshold assigned to the replication group may be greater than a used capacity threshold assigned to the user group such that the system can replicate data but not store new user data when the node used capacity exceeds the used capacity threshold assigned to the user group. In various embodiments, the capacity threshold assigned to the system group is 100%. In some embodiments, the system data includes erasure coding data to and XOR data.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

Figure 1:
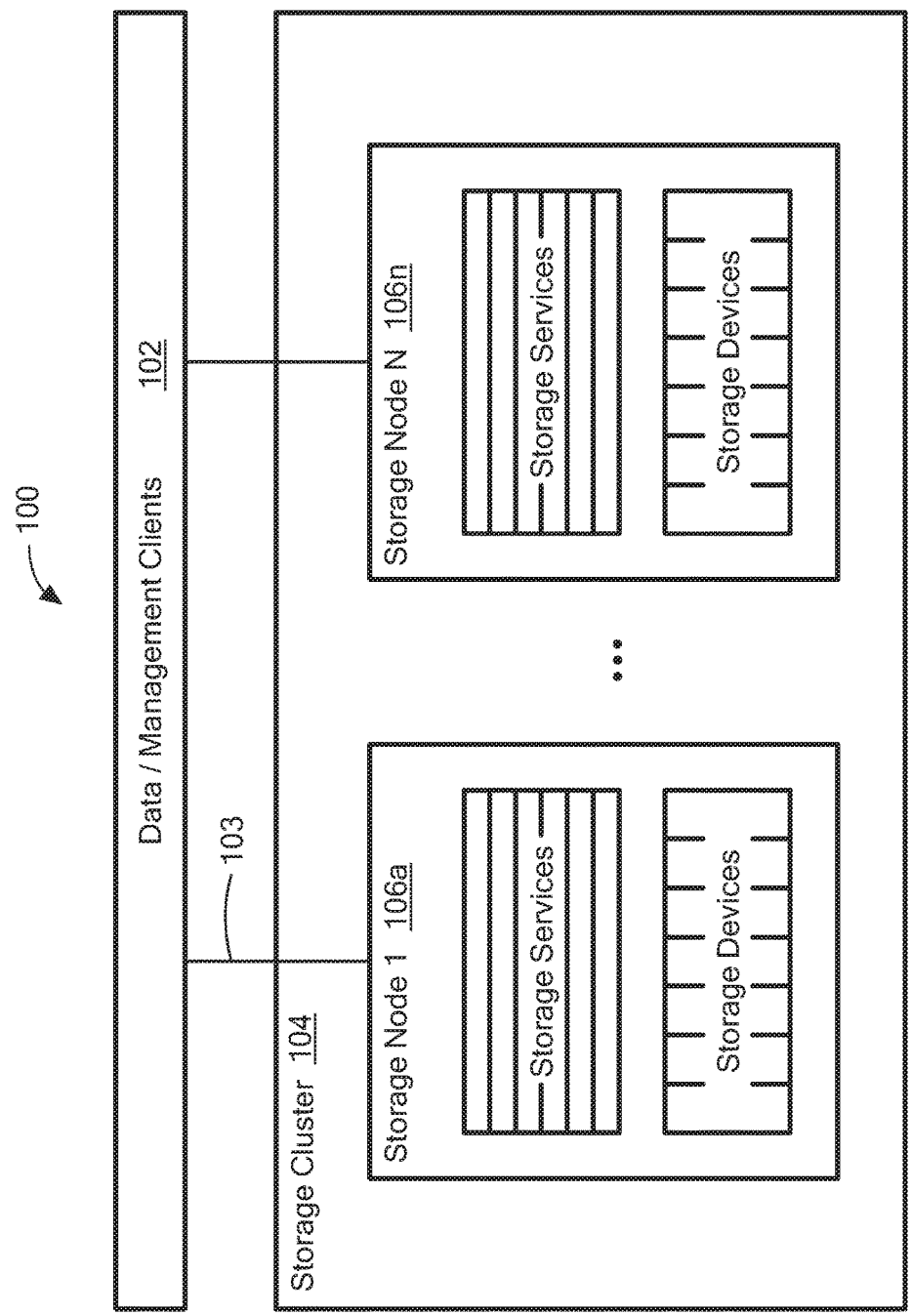
FIG. 1 is a block diagram of an illustrative distributed storage system, in accordance with an embodiment of the disclosure.
Figure 1A:
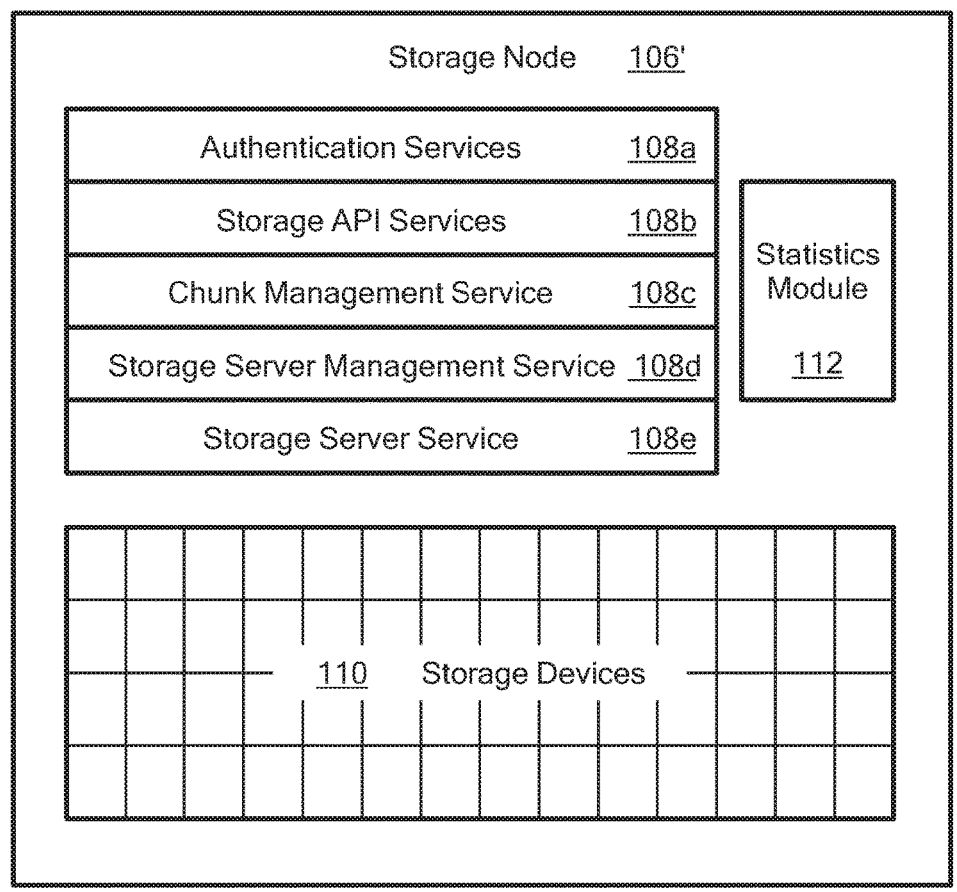
FIG. 1A is a block diagram of an illustrative storage node which may form a part of the distributed storage system of FIG. 1, in accordance with an embodiment of the disclosure.

FIG. 1 shows a distributed storage system, in accordance with an embodiment of the disclosure. An illustrative distributed storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. The storage cluster 104 includes one or more storage nodes 106a . . . 106n (generally denoted 106). An illustrative storage node is shown in FIG. 1A and described below in conjunction therewith.

In general operation, clients 102 issue requests to the storage cluster 104 to read and write data. Write requests may include requests to store new data and requests to update previously stored data. Data read and write requests include an ID value to uniquely identify the data within the storage cluster 104. A client request may be received by any available storage node 106. The receiving node 106 may process the request locally and/or may delegate request processing to one or more peer nodes 106. For example, if a client issues a data read request, the receiving node may delegate/proxy the request to peer node where the data resides.

In various embodiments, the distributed storage system 100 comprises an object storage system, wherein data is read and written in the form of objects, which are uniquely identified by object IDs. In some embodiments, the storage cluster 104 utilizes Elastic Cloud Storage (ECS) from EMC Corporation of Hopkinton, Mass.

Storage nodes 106 may include (or otherwise be coupled to) respectively storage devices, as described below in conjunction with FIG. 1A. Individual storage nodes 106 may utilize capacity exhaustion prevention mechanisms described below in conjunction with FIGS. 2-5.

FIG. 1A shows a storage node, in accordance with an embodiment of the disclosure. A storage node 106' may be the same as or similar to a storage node 106 in FIG. 1. The illustrative storage node 106' includes one or more services 108 and one or more storage devices 110. A storage node 106' may include a processor (not shown) configured to execute instructions associated with the services 108.

In the example shown, a storage node 106' includes the following services: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices and to track storage devices states; and a storage server service 108e to interface with the storage devices 110.

A storage device 110 may comprise one or more physical and/or logical storage devices attached to the storage node 106a. A storage node 106 may utilize VNX, Symmetrix VMAX, and/or Full Automated Storage Tiering (FAST), which are available from EMC Corporation of Hopkinton, Mass. While vendor-specific terminology may be used to facilitate understanding, it is understood that the concepts, techniques, and structures sought to be protected herein are not limited to use with any specific commercial products.

A storage node 106' may track storage capacity for its locally attached storage devices 110. In particular, a node may track total storage capacity and used storage capacity. In some embodiments, the node 106' includes a statistics module 112 to track storage capacity. Using this information, the chunk management service 108c can implement capacity exhaustion prevention controls by refusing to allocate new storage chunks under certain conditions. Illustrative capacity exhaustion prevention techniques are described below in conjunction with FIG. 2-5.

Figure 2A:
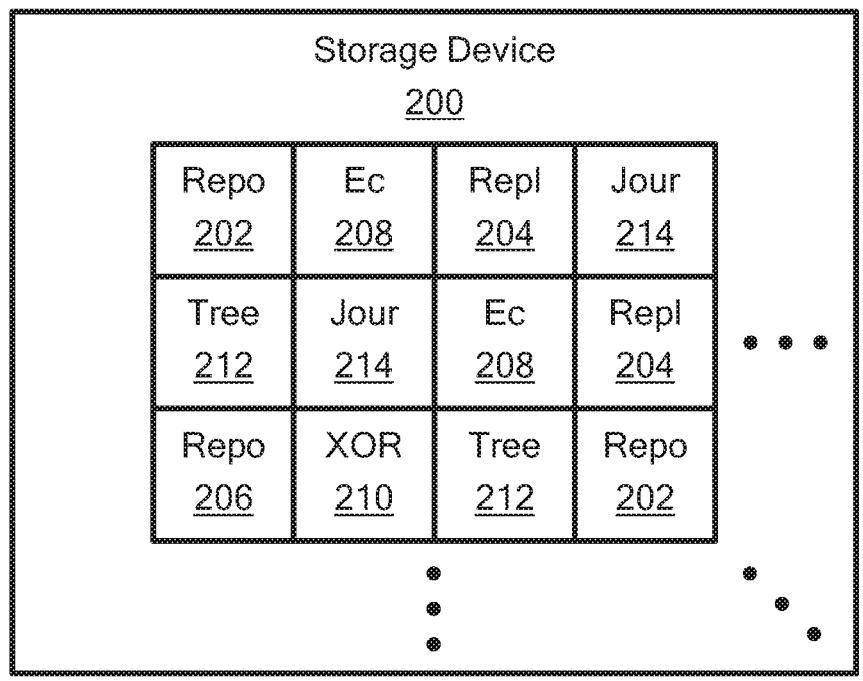
FIG. 2A is a diagram of an illustrative storage device, in accordance with an embodiment of the disclosure.

FIG. 2A shows how storage capacity within storage devices 200 may be partitioned into different types of storage chunks, according to some embodiments of the disclosure. For example, user data may be stored in so-called "repository chunks" 202. Data replicated from a remote storage systems may be stored in so-called "replication chunks" 204. In some embodiments, the system is capable of recovering data using so-called "recovery chunks" 206. In various embodiments, the system utilizes erasure coding to minimize capacity overhead on data protection within a single storage system and/or utilizes XOR to minimize capacity overhead associated with data replication, storing resulting data in "erasure coding chunks" 208 and "XOR chunks" 210, respectively. As used herein, the term "XOR" refers to a technique of computing exclusive or (i.e., the XOR logical operator) of a first stored chunk and a second stored chunk and storing the XOR result such that if either the first or second stored chunks becomes unavailable, the unavailable chunk can be retrieved using an available chunk and the XOR result. Metadata may be stored in a tree-like structure (e.g., a B+ tree) and the corresponding tree elements may be stored in so-called "tree chunks" 212. In some embodiments, tree updates are batched using journaling, wherein per-tree journal data structures may be stored in so-called "journal chunks" 214.

Figure 2B:
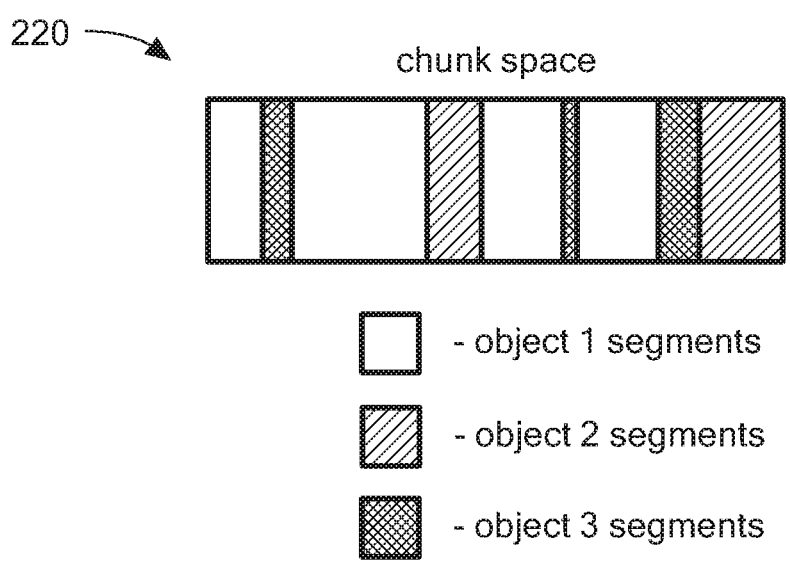
FIG. 2B is a diagram of an illustrative storage chunk, in accordance with an embodiment of the disclosure.

FIG. 2B illustrates how a storage chunk 220 can be shared between multiple user objects, B+ trees, or other data structures, according to an embodiment of the disclosure. For example, as shown, a repository chunk 220 may include fragments of several user objects 222a, 222b, and 222c. As another example, a tree chunk could include elements from a multiple different B+ trees.

Figure 3:
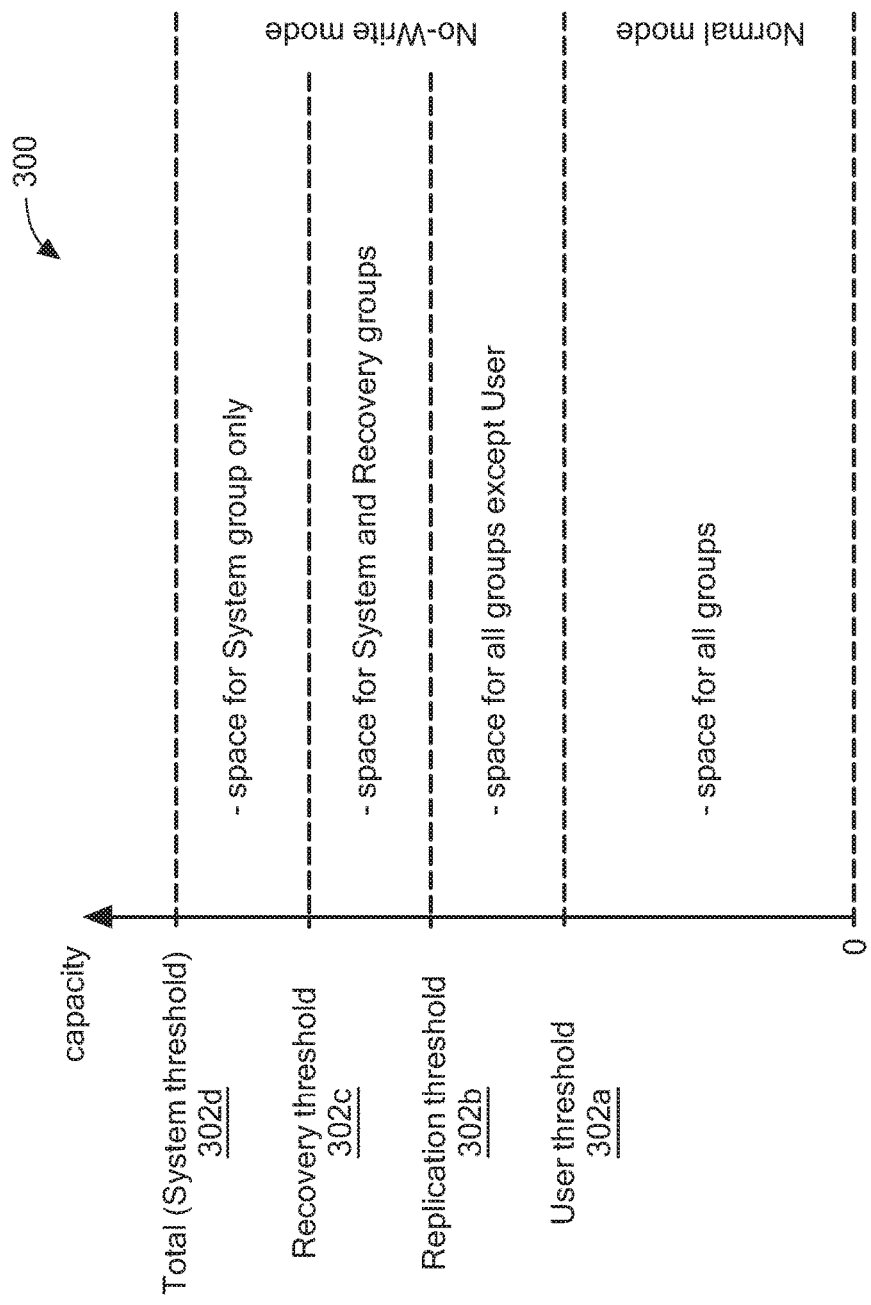
FIG. 3 is a diagram of storage chunk group thresholds, in accordance with an embodiment of the disclosure.

Referring to FIG. 3, storage nodes within a distributed storage system may include a threshold-based control mechanism to prevent storage capacity 300 from being exhausted, according to some embodiments of the disclosure. The system can differentiate between storage capacity allocated for different purposes by categorizing storage chunks using so-called "chunk groups" 302. A chunk group 302 can be assigned a threshold value (referred to as the "used capacity threshold"), which indicates the maximum percentage of total storage capacity for a node that should be allocated to chunks within that group.

In the example shown, storage chunks are categorized using four (4) groups: a user group 302a comprising repository chunks, a replication group 302b comprising replication chunks, a recovery group 302c comprising recovery chunks, and a system group 302d. The system group 302d comprises storage chunks used for various system critical processes, such as tree chunks and journal chunks. The system group 302d may also include chunks used to optimize storage capacity, such as erasure coding chunks and XOR chunks.

A storage node 106 can track its total storage capacity and used storage capacity (e.g., using statistics module 112 in FIG. 1A). The total and used storage capacity can be expressed as absolute values, such as a number of bytes, blocks, chunks, or any other suitable unit. These values can be used to calculate the percentage of storage capacity in use. This percentage is referred to herein as the "node used capacity."

When a request is made to allocate a storage chunk of a given type, the system (or more particularly the chunk management service 108c) determines which group 302 the chunk belongs to and then compares the current node used capacity to the used capacity threshold assigned to the chunk group. If the node used capacity is below the chunk group threshold, a new chunk may be allocated. Otherwise, the system may return an error indicating insufficient storage capacity.

Although the systems and processes sought to be protected herein are not limited to any specific chunk groups or associated used capacity thresholds, it is recognized herein that certain group-threshold orderings may be desirable. For example, as shown in FIG. 3, the user group 302a may be assigned the lowest threshold. When the node used capacity is below the user threshold 302a, the node accepts new user data to be stored and is said to be in "normal" model. Otherwise the node is in "no-write mode," wherein it refuses to accept new user data. The replication group 302b threshold may be set higher than the user threshold 302b. This allows user data already stored on a remote storage node 106 to be replicated even after the system switches to no-write mode. These choices reflect a policy goal of protecting existing user data over accepting new user data.

The user data recovery group 302c may be higher than the replication threshold 302b but less than 100%. Thus, the ability to recover user data is prioritized over replication.

The system group 302d threshold may be set to 100%, meaning that critical system processes along with processes that optimize storage are allowed to allocate chunks whenever possible. In the example shown, the threshold assigned to the recovery group 302c effectively determines the amount of storage capacity reserved for the system group 302d. The system group reserved capacity may be selected based upon the expected operation of the system. For example, one factor that may be considered is the rate at which new chunks are allocated for trees and journals vs. the rate at which unused chunks can be reclaimed via garbage collection. It is noted that, although erasure coding and XOR processes may allocate new chunks during intermediate processing, the overall effect of these processes is to decrease the number of storage chunks in use.

Because storage chunks may be added to the system on a continuous basis and process that reclaim storage capacity (e.g., garbage collection) may operate in a general continuous manner, there is a risk of the system frequently switching (or "bouncing") between normal mode and no-write mode. Such behavior is particularly disruptive to user transactions that can fail entirely if the system enters no-write mode even momentarily.

To prevent frequent switching between normal and no-write modes, the capacity exhaustion prevention mechanism may include hysteresis. In particular, the used capacity threshold assigned to a chunk group can be treated as a "high water mark" and a corresponding "low water mark" may be defined (e.g., as 95% of the high water mark). When the node used capacity exceeds a group's high water mark, no new chunks cannot be allocated within that group until such time as the node used capacity falls below the group's low water mark.

Figure 4:
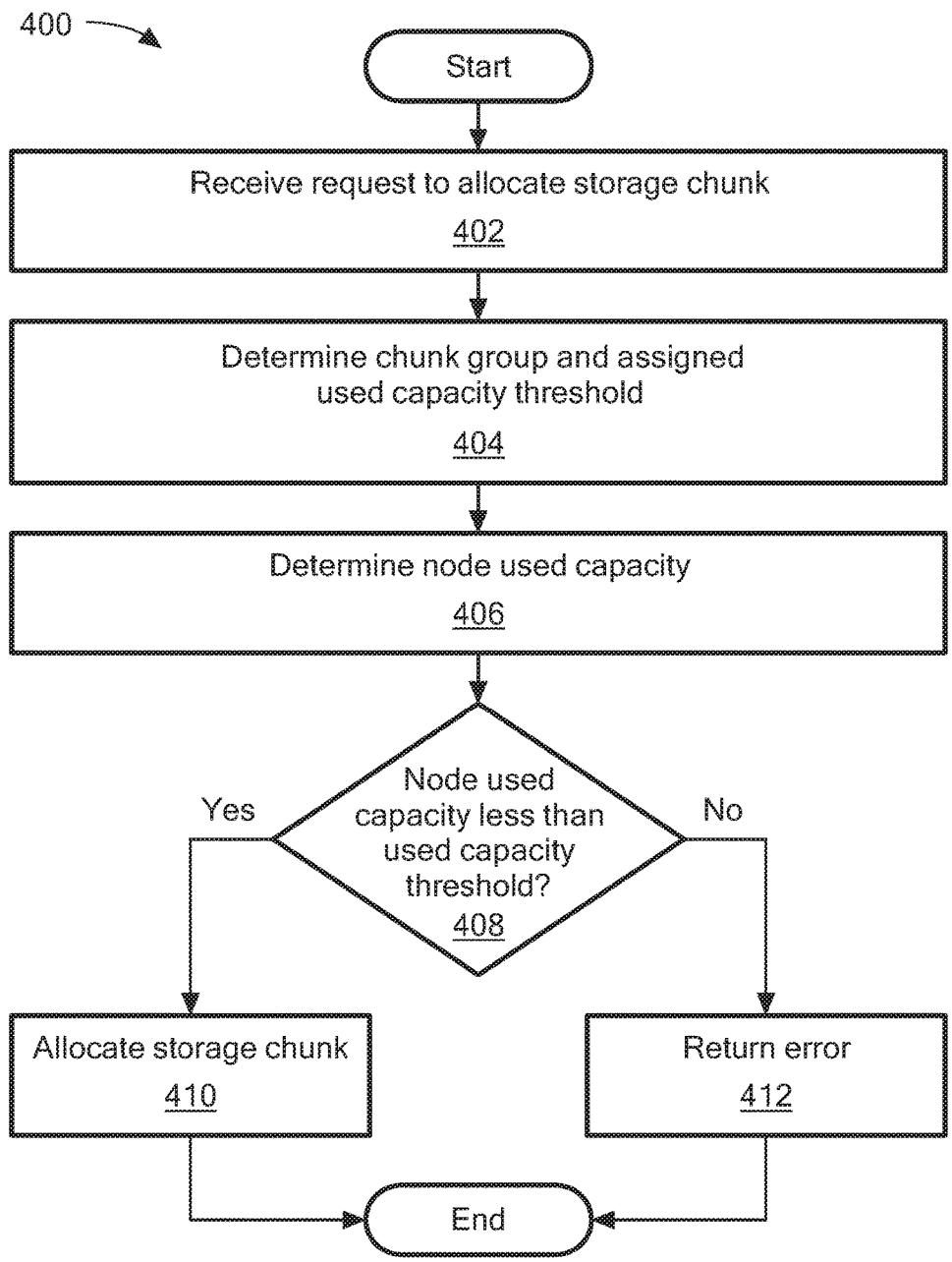
FIGS. 4, 5A, and 5B are flow diagrams showing illustrative processes that may be used within the distributed storage system of FIG. 1, in accordance with several embodiments of the disclosure.
Figure 5A:
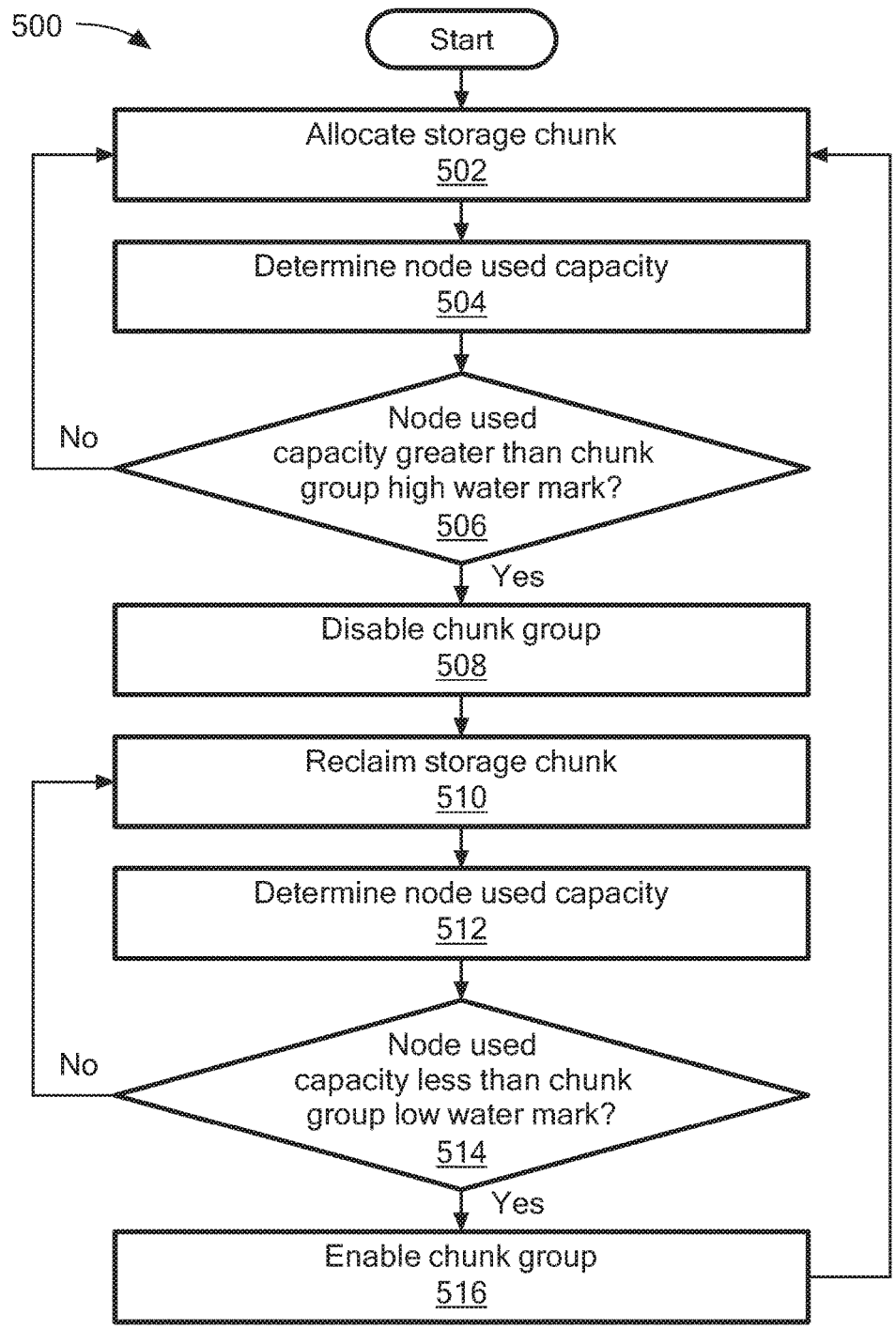
Figure 5B:
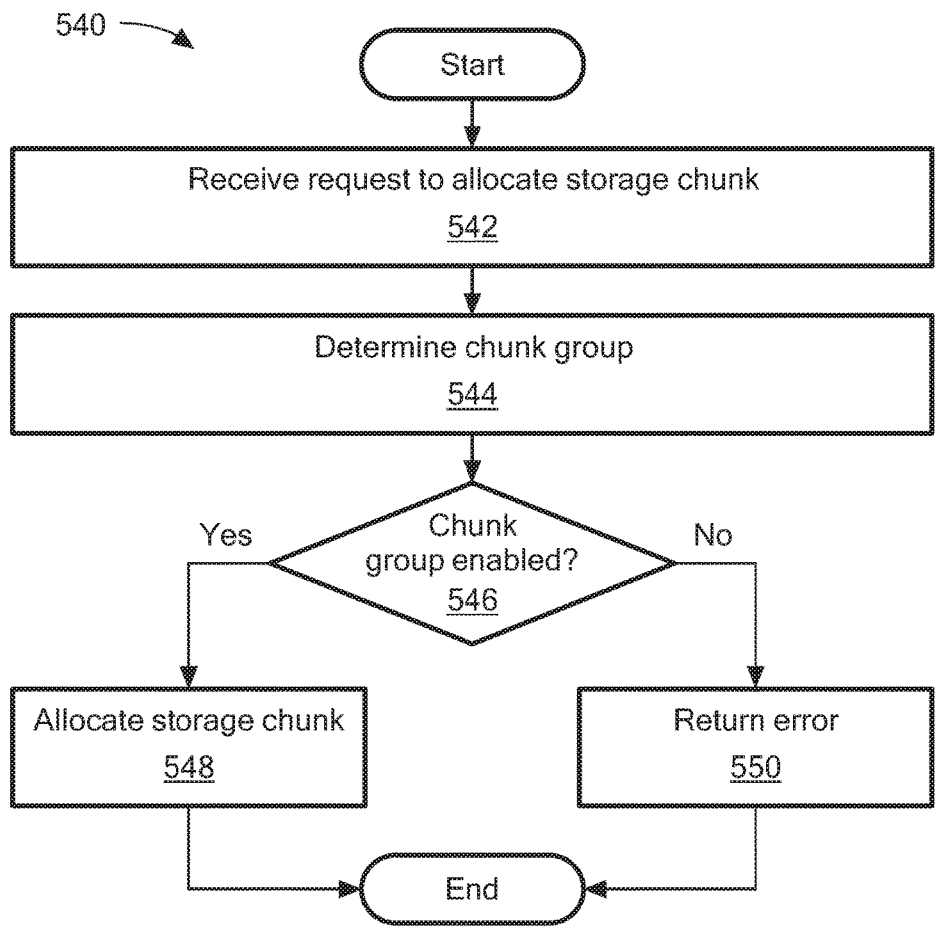

FIGS. 4, 5A, and 5B are flow diagrams showing illustrative processing that can be implemented within one or more storage nodes 106 (FIG. 1) of a distributed storage system. Rectangular elements (typified by element 402 in FIG. 4), herein denoted "processing blocks," represent computer software instructions or groups of instructions. Diamond shaped elements (typified by element 408 in FIG. 4), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4, an illustrative process may be used to prevent storage capacity exhaustion, in accordance with an embodiment of the disclosure. At block 402, a request is received to allocate a storage chunk. The request may indicate the chunk type, such as a repository chunk 202, a replication chunk 204, or other chunk type described above in conjunction with FIG. 2. At block 404, the chunk type can be mapped to a chunk group 302 (FIG. 3) having an assigned used capacity threshold. At block 406, the node used capacity is determined (e.g., using statistics maintained by the node). If, at block 408, the node used capacity is less than then chunk group used capacity threshold, then a new storage chunk may be allocated at block 410. Otherwise, at block 412, an error may be returned indicating insufficient storage capacity.

FIGS. 5A and 5B illustrate processes to prevent storage capacity exhaustion, in accordance with an embodiment of the disclosure. In contrast to FIG. 4, the processes of FIGS. 5A and 5A utilize hysteresis to prevent frequent switching between normal and no-write modes (i.e., "bouncing").

Referring to FIG. 5A, an illustrative process 500 disables a chunk group when the node used capacity exceeds a high water mark and re-enables the chunk group when the node used capacity decreases below a low water mark. The process 500 begins with the chunk group enabled. As new storage chunks are allocated, the node used capacity is compared against a high water mark (blocks 502-506). In various embodiments, the high water mark is set to the chunk group's used capacity threshold. If the node used capacity is greater than (or, in some embodiments, greater than or equal to) the high water mark, the group is disabled (block 508). As storage chunks in the group are reclaimed, the node used capacity is compared against a low water mark (blocks 510-514). If the node used capacity is less than (or, in some embodiments, less than or equal to) the lower water mark, the group is enabled (block 516).

In some embodiments, the processing and decision blocks of FIG. 5A represent states and transitions, respectively, within a finite-state machine.

Referring to FIG. 5B, an illustrative process 540 allocates storage chunks within a given chunk group only if the group is enabled. At block 542, a request to allocate a storage chunk is received and, at block 544, a corresponding chunk group may be determined. If, at block 546, the chunk group is enabled, a new storage chunk may be allocated (block 548). Otherwise, an error may be returned indicating insufficient storage capacity (block 550).

Figure 6:
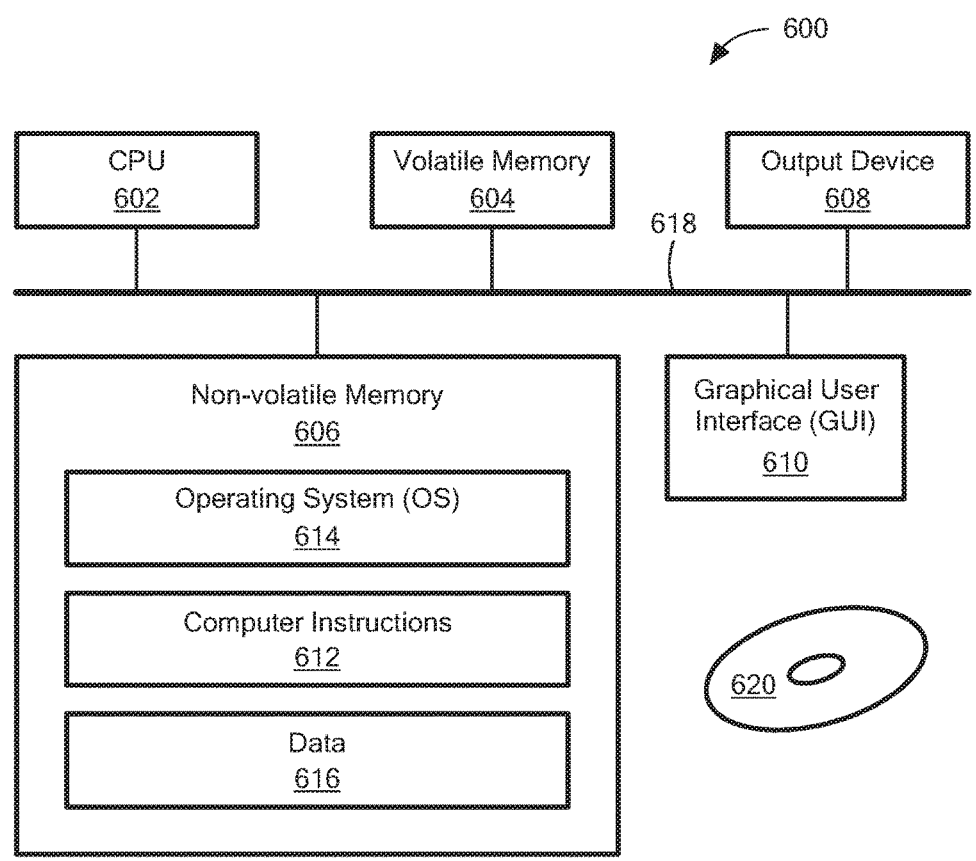
FIG. 6 is a schematic representation of an illustrative computer for use with the system of FIGS. 1 and 1A, in accordance with an embodiment of the disclosure.

FIG. 6 shows an illustrative computer or other processing device 600 that can perform at least part of the processing described herein, in accordance with an embodiment of the disclosure. The computer 600 includes a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 stores computer instructions 612, an operating system 614, and data 616. In one example, the computer instructions 612 are executed by the processor 602 out of volatile memory 604. In one embodiment, an article 620 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for use with a storage node of a distributed storage system having a plurality of storage nodes, the storage node having a plurality of storage devices, the method comprising:
   maintaining statistics on storage capacity used within the storage devices;
   receiving a request to allocate a storage chunk having a given chunk type;
   using the chunk type to determine a chunk group from a plurality of chunk groups, each of the chunk groups having an assigned used capacity threshold, wherein the plurality of chunk groups include a user group associated with user data and a system group associated with system data;
   determining a node used capacity based on the statistics; and
   allocating a new storage chunk within the plurality of storage devices only if the node used capacity is less than the chunk group used capacity threshold, wherein a used capacity threshold assigned to the system group is greater than a used capacity threshold assigned to the user group such that the system can store new system data but not new user data when the node used capacity exceeds the used capacity threshold assigned to the user group.

2. The method of claim 1 further comprising:
   returning an error indicating insufficient storage capacity if the node used capacity is greater than the chunk group used capacity threshold.

3. The method of claim 1 wherein the used capacity threshold assigned to the system group is 100%.

4. The method of claim 1 wherein the system data includes erasure coding data and XOR data.

5. The method of claim 1 further including using hysteresis to prevent frequent switching between accepting new user data and not accepting new user data.

6. The method of claim 5 wherein the chunk groups further include a replication group associated with replication data.

7. The method of claim 6 wherein a used capacity threshold assigned to the replication group is greater than a used capacity threshold assigned to the user group such that the system can replicate data but not store new user data when the node used capacity exceeds the used capacity threshold assigned to the user group.

8. A distributed storage system, comprising:
a plurality of storage nodes each having one or more storage devices and being configured to:
maintain statistics on storage capacity used within the storage devices;
receive a request to allocate a storage chunk having a given chunk type;
use the chunk type to determine a chunk group from a plurality of chunk groups, each of the chunk groups having an assigned used capacity threshold, wherein the chunk groups include a user group associated with user data and a system group associated with system data;
determine a node used capacity based on the statistics; and
allocate a new storage chunk within the plurality of storage devices only if the node used capacity is less than the chunk group used capacity threshold, wherein a used capacity threshold assigned to the system group is greater than a used capacity threshold assigned to the user group such that the system can store new system data but not new user data when the node used capacity exceeds the used capacity threshold assigned to the user group.

9. The distributed storage system of claim 8 wherein each of the plurality of storage nodes is further configured to return an error indicating insufficient storage capacity if the node used capacity is greater than the chunk group used capacity threshold.

10. The distributed storage system of claim 8 wherein the used capacity threshold assigned to the system group is 100%.

11. The distributed storage system of claim 8 wherein each of the plurality of storage nodes is further configured to use hysteresis to prevent frequent switching between accepting new user data and not accepting new user data.

12. The distributed storage system of claim 11 wherein the chunk groups further include a replication group associated with replication data.

13. The distributed storage system of claim 12 wherein a used capacity threshold assigned to the replication group is greater than a used capacity threshold assigned to the user group such that the system can replicate data but not store new user data when the node used capacity exceeds the used capacity threshold assigned to the user group.

* * * * *